United States Patent [19]

Levine

[11] 4,216,474

[45] Aug. 5, 1980

[54] PULSE FREQUENCY MODULATOR AND COMPRESSOR FOR STAIRCASE FM RADAR SYSTEMS

[75] Inventor: Arnold M. Levine, Chatsworth, Calif.

[73] Assignee: International Telephone and Telegraph Corporation, New York, N.Y.

[21] Appl. No.: 972,709

[22] Filed: Dec. 26, 1978

[51] Int. Cl.[2] .............................................. G01S 9/233
[52] U.S. Cl. ........................... 343/17.2 PC; 343/9 PS
[58] Field of Search ....................... 343/9 PS, 17.2 PC

[56] References Cited

U.S. PATENT DOCUMENTS

| | | | |
|---|---|---|---|
| 3,271,765 | 9/1966 | Pulford | 343/17.2 PC X |
| 3,355,579 | 11/1967 | Robertson | 343/9 PS X |
| 3,483,387 | 12/1969 | Davis, Jr. | 343/17.2 PC X |
| 3,483,557 | 12/1969 | Skenderoff et al. | 343/9 PS X |
| 3,569,967 | 3/1971 | Gendreu et al. | 343/17.2 PC |

Primary Examiner—Malcolm F. Hubler
Attorney, Agent, or Firm—William T. O'Neil

[57] ABSTRACT

A pulse compression radar which transmits a step-wise FM pulse and correlates at the receiver using a bank of delay lines (having progressively increasing delays) of the fiber optic type. One such delay line corresponds to each step of the frequency modulation program transmitted. The summed delay line outputs converted to electrical signals are summed to provide the compression desired. A suitably amplified stair-step received echo signal is applied to control the deflection of a Bragg cell illuminated from a laser source, the variable light ray deflection produced by the Bragg cell being focused progressively at the input of each of the discrete fiber optic delay lines. The same bank of fiber optic delay lines is employed in an oscillator loop, these delay lines being effectively electronically switched into place sequentially in the frequency determining feedback loop of the oscillator circuit. The same or a different laser source floods all inputs of the fiber optic delay lines through a light modulator in the feedback path, the desired stair-step FM transmitted signal being a modulation on the light energy employed in the oscillator configuration. Time-sharing transmit/receive and light source wavelength/color separation embodiments are shown.

10 Claims, 4 Drawing Figures

PULSE FREQUENCY MODULATOR AND COMPRESSOR FOR STAIRCASE FM RADAR SYSTEMS

BACKGROUND OF THE INVENTION

1. Field of the Invention

This invention relates to radar systems generally and more specifically to frequency modulated pulse radars employing pulse compression.

2. Description of the Prior Art

In the prior art, frequency-modulation pulse compression systems are known. The text "Introduction to Radar Systems" by Merrill I. Skolnick (McGraw Hill 1962, Library of Congress Catalog No. 61-17675) provides background information, particularly in Section 10.9 of that text. Additional technical literature references are called out therein for further background information relating to the general type of system to which the present invention applies.

According to the published art, it is old to frequency modulate the transmitted pulse of a radar system and to use pulse compression on the received pulse. Such pulse compression has been effected through use of "matched filters," dispersive delay lines, or the like. Also known is step-wise frequency modulation approximating a linear or other frequency modulation function in discrete steps within the transmitted pulse. Through the use of a number of frequency steps within each transmitted pulse, a smooth analog curve of frequency variation can be closely approximated, and the system is, in view of the discrete step arrangement, readily adapted to digital implementation.

The so-called Bragg cell, which is a key element of the combination of the invention is known per se and has been employed in spectrum analysis and simultaneous frequency monitoring over a wideband of frequencies. The technical literature describes and documents the characteristics of Bragg cells as such. Their implementation in various applications of interest is also documented. One such technical report is entitled "Acousto-Optics Light the Path to Broadband ESM Receiver Design" which appeared in the periodical "Microwaves," September 1977. That periodical is published by Hayden Publishing Company, Rochelle Park, N.J.

Another summary article concerning Bragg cells appeared in the July/August 1976 issue of EW (Electronic Warfare), a periodical published by E. W. Communications, Inc., 3975 East Bayshore Road, Palo Alto, Calif. Suffice it to say herein that those of skill in this art will be able to construct a Bragg cell component and provide its supporting circuitry as required in the combination of the present invention.

Basically, the Bragg cell is a device capable of deflecting a light beam directly as a function of an applied frequency signal, and can operate with a frequency control signal in the GHz region providing the capability of handling directly received (and suitably power amplified) radar echo signals. The Bragg cell may also, of course, be applied at lower intermediate frequencies.

In the prior art, the transmitted pulse frequency-modulation envelope is normally generated by a first apparatus, and the received echo signals are correlated by a second apparatus including the matched filter or the dispersive delay line technique, for example. Whether the system is of the analog or digitally instrumented type, the fact of separate transmitting and receiving frequency modulation and pulse compression apparatus, respectively has been a serious problem in systems of that type. Time-frequency tracking between the transmitting and receiving frequency variation functions is vital if good performance from such a system is to be achieved. In linear pulse FM systems for example, it has been difficult to match the transmitting FM function with the received correlation function, and to achieve the type of stability required.

The manner in which the present invention deals with the disadvantages of the prior art to provide a unique pulse FM radar system with stable matching of the received signal correlator will be understood as this description proceeds.

SUMMARY

According to the invention, the same bank of highly stable fiber optic delay lines is used for the transmitted pulse frequency-modulation program and for the received echo pulse frequency-dispersive delay function for correlation. Accordingly, whatever minute changes of delay characteristic might be encountered due to temperature or other environmental extremes, will not cause differential variation between transmitted and received characteristics.

For generation of the transmitted pulse frequency program, the input ends of the fiber optic delay lines are illuminated by first light energy, preferably from a laser beam source, through a light modulator. Each of the individual optic delay lines corresponds to a step of the transmitted FM program and accordingly provides a delay which, when inserted into an oscillator feedback path, facilitates the generation of that particular discrete frequency. Each fiber optic delay line output feeds a discrete optical-to-electrical signal transducer and the resulting electrical output signals are sequentially switched and appropriately amplified to provide a sequential feedback delay to the aforementioned light modulator. Each sequential delay provides a discrete corresponding oscillator frequency. Appropriate gating is provided so that this first light source is enabled only during the pulse generation time, a second laser light source which in a first embodiment may actually be obtained from the first laser generator, passes its light beam through a Bragg cell which is controlled by received echo signals such that light beam deflection is produced as a function of instantaneous received frequency. The deflected beam thus assumes a series of instantaneous angular positions each corresponding to the input of a discrete one of the optical delay lines. The aforementioned optical-to-electric transducer outputs are summed, appropriately gated (in the first embodiment) at the summer output to avoid signal output during transmitting pulse generation and provided as a signal output from this gated summer output.

In the time-shared transmit/receive configuration of FIG. 2, the two laser sources are of different colors and the optical-to-electric transducers at the output of the optical delay lines are duplicated forming two sets, the filters of each set are responsive to the corresponding laser color, making time-sharing unnecessary.

The details of the preferred embodiments with additional information on variations and modifications will be understood from the description hereinafter.

DETAILED DESCRIPTION

Figure 1:
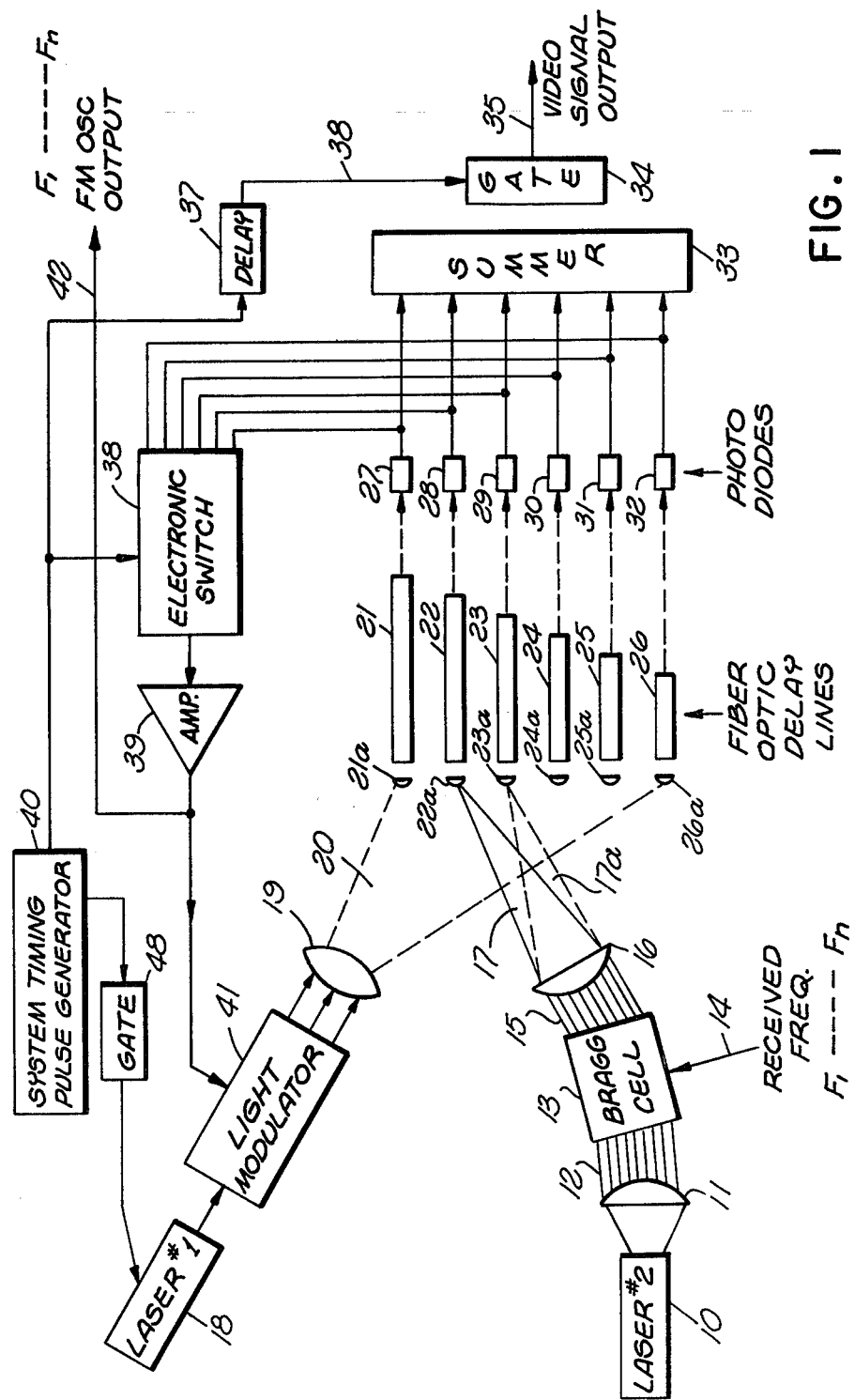
FIG. 1 is a schematic block diagram of a typical time-sharing embodiment employing the principles of the invention.

Referring now to FIG. 1, light energy sources 18 and 10 are illustrated as lasers nos. 1 and 2 respectively. In this embodiment the light energy wavelength/color of these two sources may be the same, and therefore, notwithstanding the illustration of separate sources 10 and 18 it is possible to use a single light energy source, with a mirror or other type of beam divider system to provide both first and second light energies from the same basic source with light switches inserted in the laser beams. The optical delay lines 21, 22, 23, 24, 25 and 26 are shown scaled in length to provide the progressively varying delay required for receiving correlation as well as for the step frequency modulation of the transmitted pulse. Each of these delay lines, which are preferably of the fiber optic type, are well known in the art per se. The term "optical delay line" as used herein includes fiber optic light conducting elements. The thread-like, glass, optical fibers are flexible and can be wound on spools for mechanical convenience. The delay provided is of course equal to the transit time of light within the optical conductor, sometimes referred to as an optical waveguide.

Where the frequency to be generated is in the microwave region, the delay elements 21 through 26 would obviously be quite short physically, however, in order to accommodate the optimum frequencies of operation of components such as the light modulator 41, it may be found to be desirable to generate the step-wise frequency modulated pulse available at 42 in a somewhat lower frequency modulated pulse available at 42 in a somewhat lower frequency domain, employing frequency multiplication before this signal is fed to an RF power amplifier (see 43 in FIG. 3) for transmission. In that case, the optical delay lines 21 through 26 would obviously be quite short physically. however, in order to accommodate the optimum frequencies of operation of components such as the light modulator 41, it may be found to be desirable to generate the step-wise frequency modulated pulse available at 42 in a somewhat lower frequency domain, employing frequency multiplication before this signal is fed to an RF power amplifier (see 43 in FIG. 3) for transmission. In that case, the optical delay lines 21 through 26 would be somewhat longer and can advantageously be constructed as fiber optic elements would on a spool or mandrel in order to obtain a desired length in minimum volumetric and linear space.

Figure 4:
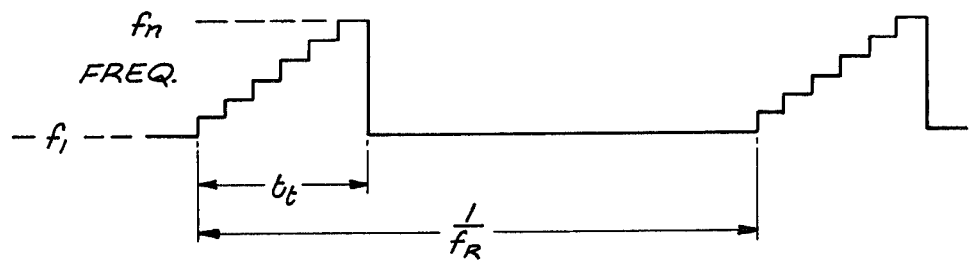
FIG. 4 is a graphical representation of the frequency vs. time relationship in the system according to the invention.

Basically, a part of the circuit of FIG. 1 is a step frequency oscillator operative during the transmit-pulse time, i.e., for a period $T_t$ as illustrated on FIG. 4 out of each pulse repetition period $1/f_r$ where $f_r$ is the pulse repetition frequency. It will be seen from FIG. 4 that the frequency of the transmitted pulse progresses stepwise each step having essentially the same dwell time, although constancy of the durations of all step dwell time is not an absolute requirement of such a system.

The frequency step durations may in fact be varied or programmed for particular purposes, such as the approximation of non-linear FM function. The presently described embodiments are capable of accommodating such a format.

Figure 2:
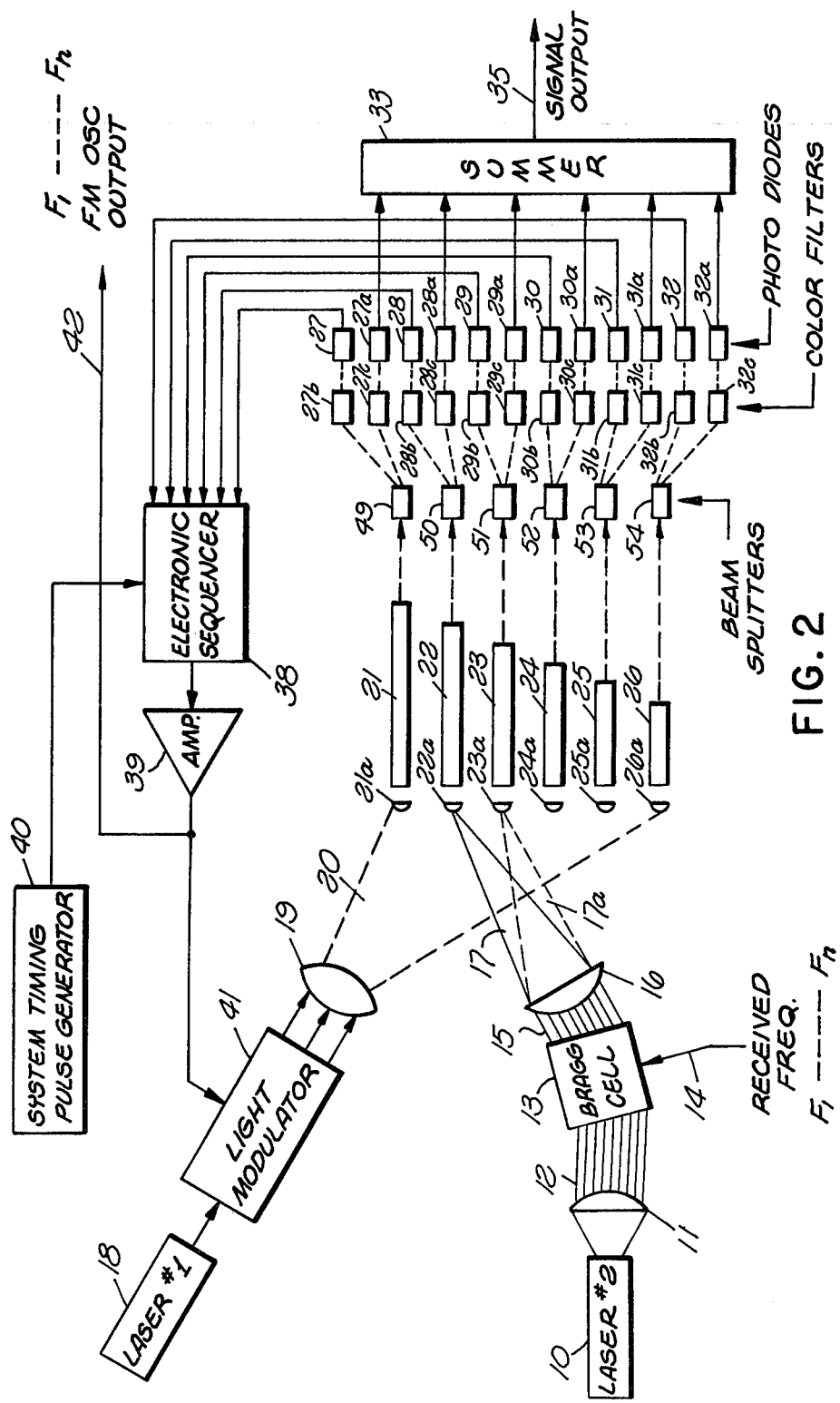
FIG. 2 is an alternative embodiment employing light-course color separation rather than time-sharing between transmitting and receiving functions.

In FIG. 4, the number of steps illustrated is selected only for illustration, to be consistent with the number of optical delay lines employed in FIG. 1 and for that matter in FIG. 2. It will be realized, however, that many more individual steps of smaller duration could readily be employed resulting in a closer approximation to a linear varying frequency-modulation envelope.

Figure 3:
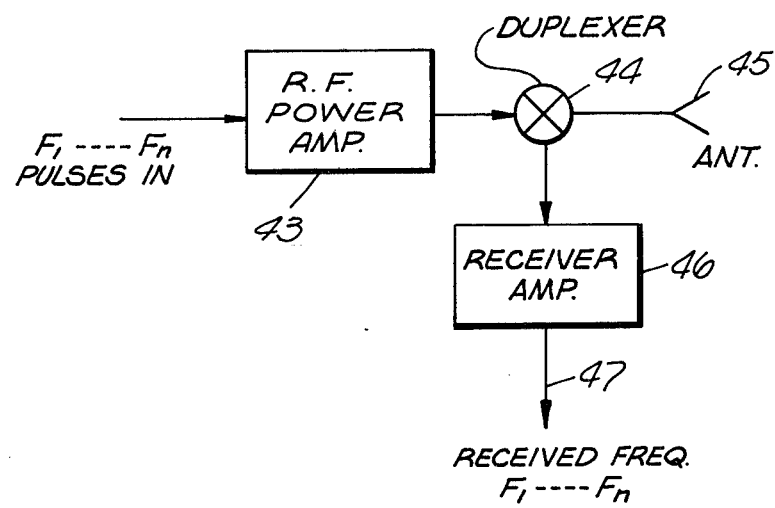
FIG. 3 is an RF component block diagram for use in a complete system employing the invention.

Before further description of FIG. 1 and its variation FIG. 2, reference is made to FIG. 3, showing the typical RF components of a pulse FM radar system. An RF power amplifier 43 accepts the output 42 from FIG. 1 or FIG. 2 with or without intervening frequency doubling, depending on whether the signal at 42 was generated at the microwave frequency to be transmitted or at a fraction of the transmittable frequencies. In FIG. 3 the output of RF power amplifier 43 passes through a conventional duplexer 44 to the receiver amplifier 46. It is to be understood that this receiver amplifier 46 might be merely a radio frequency amplifier or may involve heterodyning of the signal to a lower frequency domain, in any event the output signals therefrom at 47 would be those applied on lead 14 of FIGS. 1 and 2 to the Bragg cell 13.

In FIGS. 1 and 2, the transmitting FM pulse generator involves a feedback loop through a discrete one of the optical delay lines 21 through 26 at a time, the selected delay line being sequentially connected by electronic sequencer 38 from those delay lines to a light modulator 41 through an amplifier 39 so that the radio frequency signal generated by the oscillator loop is contained as modulation on the first light energy signal from Laser No. 1 shown at 18. It will be realized that, as each optical delay line and its optical-to-electrical transducer (photo diode for example) is switched into the oscillator circuit, the modulation frequency extant on the light signal which simultaneously illuminates the inputs of all the optical delay lines 21 through 26 is sequentially varied in accordance with the desired program. Each of the optical delay lines 21 through 26 is preferably fitted with a collector lens 21a through 26a, respectively such that the flood beam 20 simultaneously illuminates all optical delay line inputs. Lens 19 is a standard projection type lens accepting the light modulator 41 output and producing the flood beam 20 therefrom.

The same optical-to-electric signal transducers 27, 28, 29, 30, 31 and 32 in FIG. 1 which supply their outputs to the electronic sequencer 38 are also provided to summer 33 for use in connection with the receiving pulse compression function. A system timing pulse generator 40 generates the basic system pulse repetition frequency starting sequencer 38 at the beginning of each $t_t$ as depicted in FIG. 4. Sequencer 38 may be constructed so that, one sequencer 38 runs through the steps for producing the FM sequence within each transmittable pulse envelope according to the graphical representation of FIG. 4, sequencer 38 opens the loop of the oscillator until the next system timing pulse arrives from 40. Accordingly, it may not be necessary to provide the gate 48 for disabling the laser source 18 afer each period $t_t$, however, the operation of the Bragg cell controlled beam for the receiving pulse compression function is more effective in the absence of the flood beam 20 (less dynamic range required). It will be realized of course that if laser sources 18 and 10 are actually the same source split between lens 11 and light modulator 41, the beam must not be interrupted during the receiving part of the pulse repetition period, in which case Lasers 18 and 10 would indeed be independent light energy sources, the gate 48 being capable of enabling laser 18 during the transmittable pulse period $t_t$ and disabling it the remainder of the pulse repetition period. Gate 48 might alternatively be arranged to gate laser 10 on after the expiration of each period $t_t$ for the receiving period.

Since the output of summer 33 is a received signal output, it is gated off by gate 34 so that no signal appears on 35 during generation of the transmitted pulse, i.e., during each period $t_t$. For this purpose, delay 37, having a delay equal to $t_t$, provides for an enabling signal on 38 only during the bonafide receiving portion of each pulse repetition period.

Received signals such as from lead 47 of FIG. 3 at radio frequency are supplied by a lead 14 to the Bragg cell 13. As previously indicated it is a known characteristic of the Bragg cell to provide angular deflection of light rays passing therethrough as a function of the frequency of an applied control signal. The precise manner in which the Bragg cell accomplishes this deflection is well known and well documented in the art. The aforementioned technical literature references are only examples of published information describing Bragg cell operation and the implementation of light deflecting circuits using Bragg cells.

The second light energy from the laser at 10 is passed through a collimating lens 11 which produces a light energy wave front including parallel light rays 12. After deflection in the Bragg cell 13 these rays continue generally parallel, however, the light energy phase front or wave front presented to the projection lens 16 is angularly varied. At the output of lens 16 the converging light rays are represented in two typical positions 17 and 17a. The orientation and the characteristics of the lenses 21a through 26a would be such as to direct the light energy concentrated thereon into the corresponding optical fiber delay line.

The light-to-electric transducers 27 through 32 are represented as photo diodes in FIG. 1 although it is to be understood that other types of light energy-to-electric signal converters or transducers are extant in the art, which would provide the required function. The outputs of this bank of photo diodes 27 and 32 are supplied to a summer 33. The inputs to summer 33 thereby each correspond to a step in the frequency modulation program within a received each signal, which in turn corresponds to the same frequency steps in the transmitted pulse. Since these discrete frequency steps have their discrete time places within the transmitted and echo pulse, there is an appropriate delay for each which will cause all to fall within the same time increment as the last frequency step of the pulse at the summer output. Thus, pulse compression has been effected. As would be expected, the time duration of each frequency step in the transmitted FM pulse is selected with range resolution coniderations in mind. This, therefore, determines the number of steps required for a transmitted pulse of a predetermined duration. Accordingly, the six-step arbitrary representation included in FIGS. 1, 2, and 4 is typical and representative only for the purpose of explanation. Within the framework of the invention it is of course possible to have fewer or substantially more such frequency steps in a given transmitted pulse. In accordance with the previously described functions of delay 37 and gate 34, the signal output at 35 is available only after the transmitting pulse has been generated during each pulse repetition.

It will be realized, that light pulsers (switches) might be included between laser 18 and light modulator 40 and between laser 10 and collimating lens 11 as an equivalent structure, such an expedient facilitating the use of a single laser source for both light energies as implied hereinbefore.

Referring now to FIG. 2, it will be noted that many of the same components are shown in common with FIG. 1. The functions of those components are the same as described in connection with FIG. 1. The basic difference between the embodiments of FIGS. 1 and 2 is that FIG. 2 relies on the concept of providing different wavelength/color for laser 2 (source 10) as compared to laser 1 (source 18). In that way, the generation of the step-wise, frequency-modulated, transmitting pulse does not interfere in any way with the receiving functions. It does require, however, that the outputs of the fiber optic delay lines, 21 through 26, are each passed through a corresponding beam splitter producing two output channels therefrom. Accordingly, for six optical delay lines, six beam splitters, 48, 49, 50, 51, 52 and 53 are required and 12 color filters are used. These color filters are represented at 27b, 27c, 28b, 28c, 29b, 29c, 30b, 30c, 31b, 31c, 32b and 32c. The ouput of each of these color filters having the "b" suffix is provided to a photo diode in the bank 27, 27a, 28, 28a, 29, 29a, 30, 30a, 31, 31a, 32 and 32a. The photo diodes 27, 28, 29, 30, 31 and 32 are each responsive to the color filter output of the same number with small "b" suffix and the outputs thereof provide the inputs for the electronic sequencer 38 which functions the same as was described in FIG. 1. Thus these photo diodes are devoted to the transmitted pulse, frequency-modulation program generation in the same manner as described with FIG. 1. Those color filters with the small "b" suffix thus are designed to pass the light energy from 18 to the exclusion of that from 10. Those color filters with the small "c" suffix provide the complementary function, i.e., passing the color wavelength of 10 to the exclusion of that from 18. Those photo diodes 27 through 32 with the small "a" suffix provide outputs which are the inputs of the summer 33 providing the pulse compression as described in connection with FIG. 1. The electronic sequencer 38 is preferably designed such that after the discrete FM steps have all been generated within a given transmitting pulse, the beam might be further deflected so as to provide no input to any of the optical fiber delay lines until the next system timing pulse from 40 recycles the operation of 38.

Again, typical light modulators such as 41 require more than minimal control signal power, hence amplifier 39 is included, which also ensures that the output 42 is comfortably high in power level to be further handled by the RF power amplifier 43 of FIG. 3 or by a frequency multiplier preceding 43.

It will be realized that the embodiment of FIG. 2 omits the gating functions provided in connection with FIG. 1, this being possible in view of the separation of the wavelength/color of the two light energy sources.

The embodiment of FIG. 2 is more appropriate where exceedingly long transmitted pulses are employed and where useful signal echo return might be expected before the transmitted pulse is terminated. It will also be realized by those skilled in this art that the embodiment of FIG. 2 would be adaptable to FM-CW systems.

In accordance with the invention, the difficulty of point-by-point tracking the precise frequency modulation program in a linear or continuous-slope pulse FM system vis-a-vis the correlator characteristic for received pulses is eliminated through use of the same optical delay lines for both transmitting and receiving functions.

Various other modifications and variations on the embodiments illustrated and described will suggest themselves to those skilled in this art once the significant principles of the invention are understood. Accordingly, it is not intended that the drawings or this description should be considered as limiting the scope of the invention, these being intended to be typical and illustrative only.

What is claimed is:

1. In a radar system which transmits a frequency modulated signal and employs received echo signal pulse compression, the combination comprising:
   a source producing a first light energy beam;
   a plurality of optical delay lines providing a series of graded delays, each delay corresponding to the time of a discrete frequency in the frequency modulation program of said transmitted signal;
   first means for launching said first light energy beam into each of said optical delay lines discretely and selectively in a program corresponding to said frequency modulation program, said first means including means for deflecting said first light energy beam among the inputs of said delay lines as a function of each of said discrete frequencies extant in a received echo signal corresponding to said transmitted signal;
   second means for converting the outputs of said delay lines to electrical signals;
   and third means for summing said electrical signals of said second means to provide pulse compression.

2. A frequency-modulated, pulse radar system in which each transmitted pulse of a series of such pulses has a duration which is a fraction of the pulse repetition period of said system and in which the transmitted RF frequency during each transmitted pulse is varied according to a staircase function of frequency versus time, and in which received pulse compression means are included, the combination comprising:
   an RF oscillator circuit in which the frequency determining element is a fiber optic delay line, a plurality of fiber optic delay lines of individual delays being provided, each corresponding discretely to a frequency step of said staircase;
   first means including a modulatable source of first light energy providing electrical-to-optical and optical-to-electrical transducer functions at the inputs and outputs of said delay lines, respectively;
   second means in said oscillator circuit for successively switching among said delay lines according to a predetermined program to produce said staircase frequency variation within each of said transmitted pulses;
   third means including a source of second light energy and means responsive to received radio-frequency, echo signals for deflecting the beam of said second light energy as a function of the instantaneous frequency of said received echo signals, said deflection being arranged to launch the second light energy into the one of said inputs of said delay lines employed to generate the same frequency in said RF oscillator for transmission;
   and fourth means for summing said first means outputs to produce pulse compression.

3. Apparatus according to claim 2 in which said light sources of said first and third means are produced by a single light energy generator and in which fifth means are included timed to inhibit at least said fourth means output during the time of generation of said transmitted pulse and to inhibit at least said first means light energy during the remainder of said pulse repetition period following generation of said transmitted pulse.

4. Apparatus according to claim 2 in which said deflecting apparatus of said third means comprises a Bragg cell.

5. Apparatus according to claim 3 in which said deflecting apparatus of said third means comprises a Bragg cell.

6. Apparatus according to claim 2 in which said third means is further defined in that said deflecting means is a Bragg cell responsive to said second light energy and said received radio-frequency echo signals, said second light energy being generated by the same source as said first light energy.

7. Apparatus according to claim 2 in which said sources of first and second light energy are laser beam generators of different wavelength/color outputs, in which separate first and second light-to-electric signal transducers are provided at the output of each of said optical delay lines, forming a first set of electric signals connected to said sequencer and a second set of electric signals connected to said summer, and in which each of said first transducers responds to the corresponding optical delay line output through a first filter and each of said second transducers responds to the corresponding optical delay line output through a second filter, said first and second filters being constructed to pass the corresponding laser wavelength/color and substantially exclude the other.

8. Apparatus according to claim 7 in which said light-to-electric transducers are photo diodes.

9. Apparatus according to claim 3 in which said light-to-electric transducers are photo diodes.

10. Apparatus according to claim 2 in which said first means includes a light modulator responsive to said first light energy, for modulating the amplitude of said first light energy in accordance with an RF signal extant in the feedback loop of said oscillator.

* * * * *